O. THIEME.
TOTALIZER CONTROLLING MECHANISM FOR CALCULATING MACHINES.
APPLICATION FILED APR. 7, 1913.

1,206,270.

Patented Nov. 28, 1916.
6 SHEETS—SHEET 1.

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

TOTALIZER-CONTROLLING MECHANISM FOR CALCULATING-MACHINES.

1,206,270.  Specification of Letters Patent.  Patented Nov. 28, 1916.

Application filed April 7, 1913. Serial No. 759,493.

*To all whom it may concern:*

Be it known that I, OTTO THIEME, a citizen of the United States, residing at city of St. Louis, State of Missouri, have invented a certain new and useful Improvement in Totalizer-Controlling Mechanism for Calculating-Machines, of which the following is a full, clear, and exact description, such as will enable others skilled in the art to which it appertains, to make and use the same, reference being had to the accompanying drawings, forming part of this specification, in which—

Fig. 6ª is a side elevational view of the escapement mechanism for the forward totalizers shown in Fig. 6.

This invention relates to new and useful improvement in means for controlling the totalizing devices of a calculating machine, such for instance as the totalizer wheels 119 and 268 of the calculating machine disclosed in French Patent No. 383,719, dated January 16, 1908, and Belgian Letters Patent No. 202,081, dated August 21, 1907.

In the machine of the Belgian and French patents aforesaid there are three groups of totalizer wheels 119 controlled by the position of the carriage which supports the paper, that is when the carriage starts from its home position at the right and is letter spaced leftwardly, one or more adjustable blocks thereon will coöperate with a tappet to operate an escapement mechanism which controls the position of the shaft 48 on which the three groups of totalizer wheels 119 are mounted. Thus, as the carriage is stepped leftwardly, the three groups of wheels 119 may be shifted leftwardly so as to successively bring the second and third, or middle and right hand groups of totalizer wheels into coöperative relation with the actuating racks 100. When the paper supporting carriage is returned to its right hand position, the carriage restores the three groups of totalizer wheels to their home position so as to place the left hand group under control of the actuating racks 100.

In the machine of the Belgian and French patents aforesaid, when it is desired to introduce a number into the rear totalizer wheels 268, it is necessary to set up the number on the digit keys of the adding mechanism, then press the D key and rock the operating shaft. The machine of said patents shows a handle for rocking shaft, but in later designs this shaft is rocked by a motor in both directions and a motor is indicated in the accompanying drawings.

In multiple column work, such for instance as listing post-office money orders, insurance policies, etc., we may have

| | | |
|---:|---:|---:|
| 678 | $25.00 | $.06 |
| 1234 | 3.00 | .03 |
| 59 | 10.00 | .05 |

Assuming for purposes of illustration that the numbers in the left hand column represent the numbers of the post-offices at which the money orders (in the middle column) are payable; the middle column represents the amount of the money order payable at the office designated and the numbers in the right hand column represent the premium or cost of such money order; or the left hand column of numbers could represent the numbers of insurance policies, the middle column the amount of each policy, and the right hand column, the premium. It is obvious that the machine could also be useful in tabulating tax lists and in various other business computations.

It will be observed that the numbers of the post-office at which the money orders are payable, or the numbers of the insurance policies (in the left hand column) are unimportant except as designating characters, and to the extent that the total of these numbers would be nonsignificant, we may designate this column of numbers as "the nonsignificant numbers." It is important, however, to totalize the middle and right hand columns, and it is also highly desirable in doing this to avoid shifting of the front totalizer wheels on account of the movement of the parts to effect such a shift, and in order to save wear on the parts.

It is, therefore, the object of my present invention to provide means whereby the position of the paper supporting carriage will control the introduction of the "significant" items into the totalizers, preferably front and rear, without necessitating any shift of the front totalizers.

It is a further object of my invention to control the totalizers in such a way that the setting up of the nonsignificant items will effect a printing thereof, but such nonsignificant items will not be introduced into any group of totalizer wheels in the machine. I prefer to set up these nonsignificant designating items through the adding mechanism for the reason that they will all be printed in proper column order, that is, units under units, tens under tens, etc., without requiring any letter spacing adjustment of the paper carriage by the operator.

In order to understand the operation of my present invention, before going into a detailed description of the means for accomplishing the above described results, we will assume that the operator wishes to set up the numbers at the heads of the three columns. He would first operate the digit keys of the adding mechanism starting with the highest number until the number "678" was introduced into the machine. This being a nonsignificant number, the cams 82—109 would be in a neutral position so that said number would not be introduced into either front or rear totalizer, but the number would be printed in the left hand column. The tabulating mechanism which forms the subject matter of a companion application Serial Number 759,494 filed by me of even date herewith, would be operated from the operating rock shaft of the adding mechanism and the paper carriage would be automatically spaced so as to position the paper at the proper printing point to receive the middle number. This tabulating mechanism includes the bar $X^4$ provided at its lower end with a block or projection 18 on the underside of which an adjustable screw 19 is intended to engage for the purpose of raising the bar $X^4$. This screw 19 is mounted on the end of a rock arm 20 fixed on a rock shaft 21 of the adding machine. Another rock arm 22 carries a tappet at its end which coöperates with a pin on a rock arm 25 mounted on the operating rock shaft 81. The arrangement is such that when the rock arm 25 is rocked forwardly, it will pass idly over the tappet, and after passing over the tappet, permit the latter to rise under spring pressure so as to be interposed in the path of the pin on the rock arm 25 when the arm 25 is swung rearward. When the arm 25 takes the backward stroke, its pin will engage the tappet and depress the arm 22. This will rock the forward end of arm 20 upwardly, raising the tabulator bar $X^4$ so that its upper end is interposed in the path of suitable tabulator stops carried on the movable carriage to arrest the latter in its leftward movement. In this spacing of the paper carriage, the cams 82—109 would be shifted to their third position so as to place the rear totalizer wheels 268 under control of the actuating rack bars 100 so that when the significant number, $25.00, in the example under consideration was set up on the digit keys of the adding mechanism and the motor key operated, whereby the motor would rock the operating shaft of the adding mechanism, this number, $25.00, would not only be printed, but would be introduced into the rear accumulating wheels. Rocking of the operating shaft of the adding mechanism would again operate the tabulating mechanism, controlling the paper supporting carriage, and the carriage would be spaced leftwardly a second time to bring the proper printing point of the paper into position to receive the printing impression of the significant numbers composing the third or right hand column of numbers. Coincident with this last movement of the paper carriage, the cams 82—109 will be shifted to their first or normal position, placing them out of control of the rear totalizer wheels 268 and in control of the forward totalizer wheels 119.

When the significant number, $.06, is set upon the digit keys of the adding mechanism, the operator now operates the motor key to rock the operating shaft of the adding mechanism in the usual way to print the significant number and introduce it into one of the forward groups of totalizer wheels 119, and at the same time the tabulating mechanism of my companion application before referred to will be automatically operated to again space the paper carriage leftwardly. In this movement of the paper carriage leftwardly, one of the adjustable blocks on the paper carriage will come in contact with a tappet and automatically bring into operation a back spacing mechanism which will restore the paper carriage to its first or normal position in readiness to receive another printing impression of an indicating or nonsignificant number. At the same time that the carriage is being back spaced, the paper will be line spaced, but as this forms no part of my present invention, I have not shown the same in the accompanying drawing.

While the cam plate which controls the position of the cams 82—109 is designed in this application, as above described, to register the middle column of numbers in the rear totalizer, and the right hand column of numbers in one of the forward groups of totalizer wheels, it is obvious that this cam could be so shaped, by making it longer and having a series of steps in different relations to each other, so that if desired the middle column of numbers could be introduced into the forward group of totalizer wheels and the right hand column of numbers into the rear totalizer; or if more than two columns of significant numbers were to be separately accumulated, which would involve a shifting of the forward group of totalizer wheels, this cam could be so shaped as to positively control the introduction of numbers successively into the left hand, middle and right hand groups of forward totalizers and then into the rear totalizer, or the rear totalizer could be brought into operation alternately with respect to one or more forward group of totalizer wheels, or the rear totalizer could be brought into operation to accumulate the numbers of any desired column.

Figure 1:
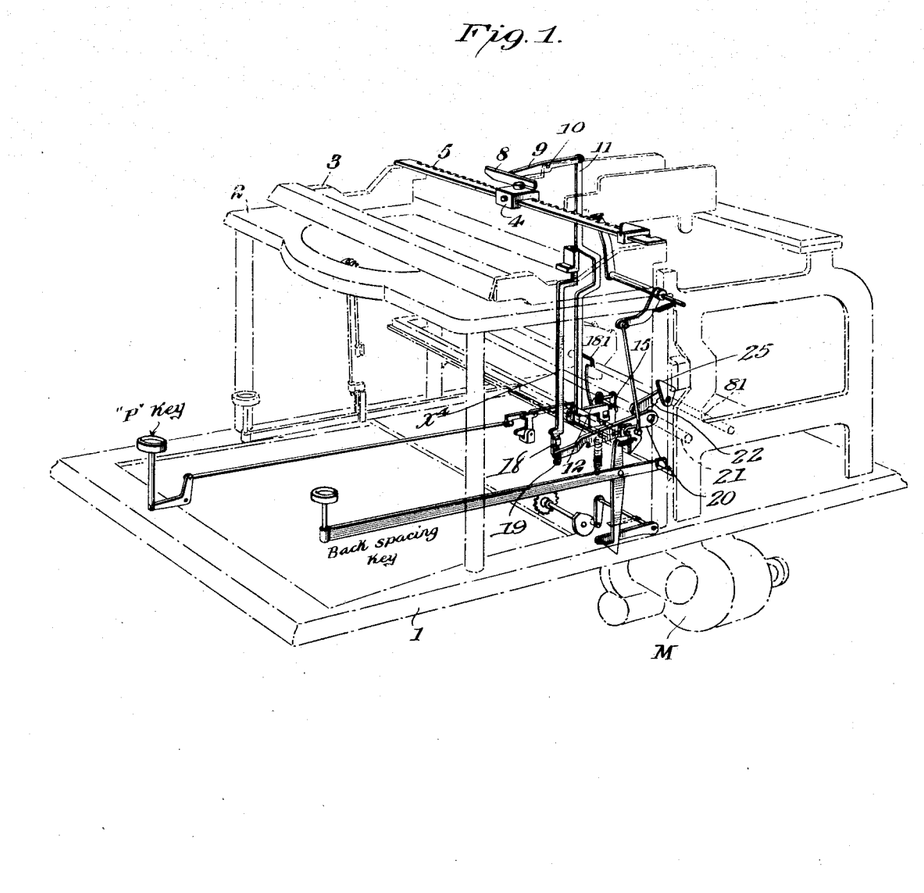
Figure 1 is a detail skeletonized view of my improved controlling mechanism.
Figure 2:
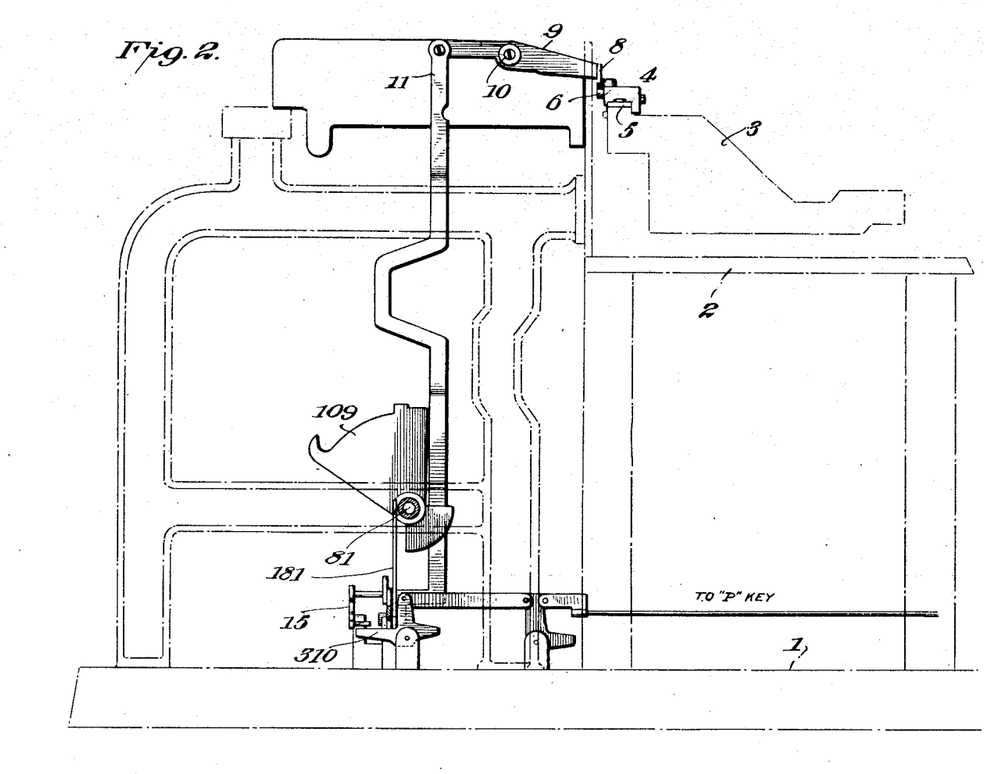
Fig. 2 is a similar view as seen from the side.

While the adding mechanism shown in the accompanying drawings is intended to be used in connection with the typewriting mechanism, the frame of which is shown in Fig. 1, together with one of the typewriter keys, shown in dotted lines, it is obvious that the typewriting mechanism could be wholly omitted if desired.

In the drawings, 1 indicates the base of the machine from which rise suitable standards for supporting a top plate 2. On this top plate and arranged to run on suitable tracks is a laterally movable carriage for supporting a sheet of paper on the platen, not shown, in a manner well known in the art. The adding mechanism as disclosed in the Belgian and French patents aforesaid has a keyboard consisting of ten digit keys the rear ends of which operate rods 56 and these rods position the pins 62 in the laterally movable carriage 57. When a number has been set up in this carriage, the carriage is bodily lifted so as to position a set of stop pins 93 arranged in the stationary frame.

When the motor key is pressed, it will release a clutch controlling the constantly running motor M, in consequence of which, the operating rock shaft 81 of the adding mechanism will be rocked first forwardly and then backwardly approximately through an arc of seventy degrees. When shaft 81 is rocked it will rock with it the cams 82—109. The normal position of these cams is such that the cam 109 will, through connections not shown here, operate idly on its forward stroke, but on its back stroke it will cause the group of totalizer wheels 119 or 268 in operative relation to the racks 100 to be drawn down into mesh with said racks so that on the backward movement of said racks, the significant number will be introduced into the accumulating wheels.

As fully described in the Belgian and French patents, aforesaid, cams 82—109 are shifted along the shaft 81 from their normal or first position to their neutral or middle position or to their third position, in which latter said cams control the rear totalizer and its carrying mechanism.

Figure 3:
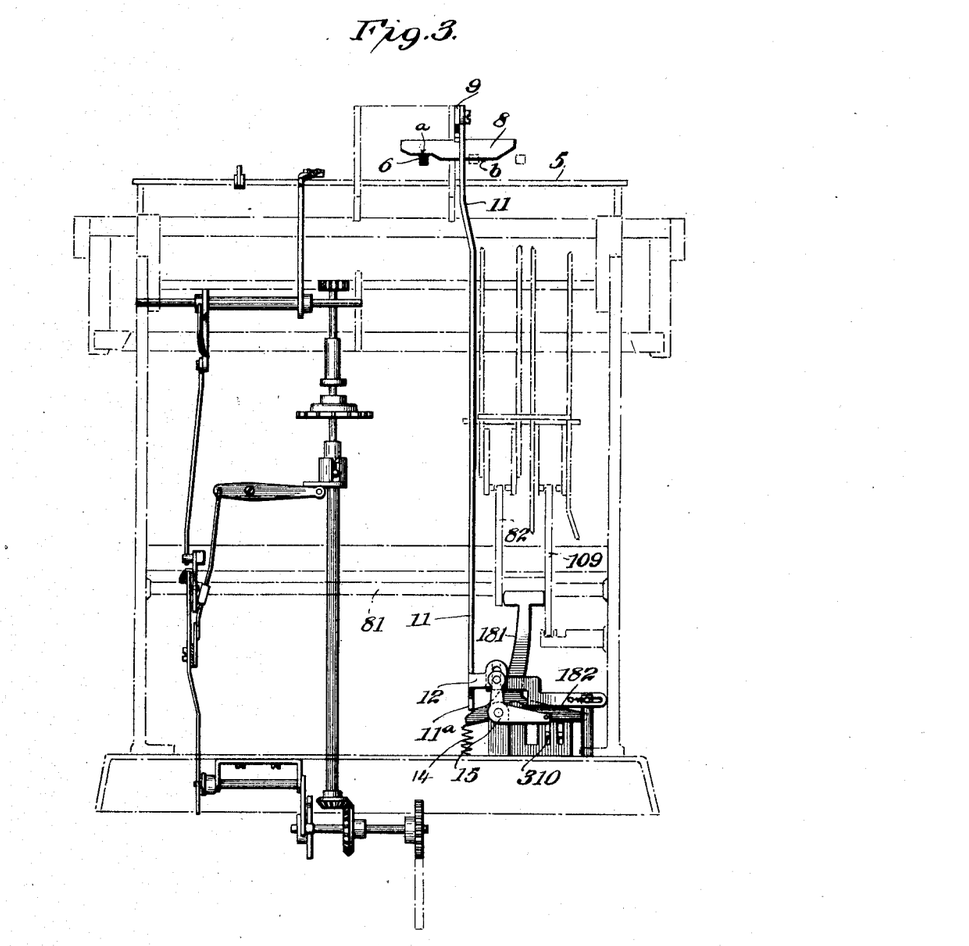
Fig. 3 is a similar view as seen from the rear.
Figures 4, 5:
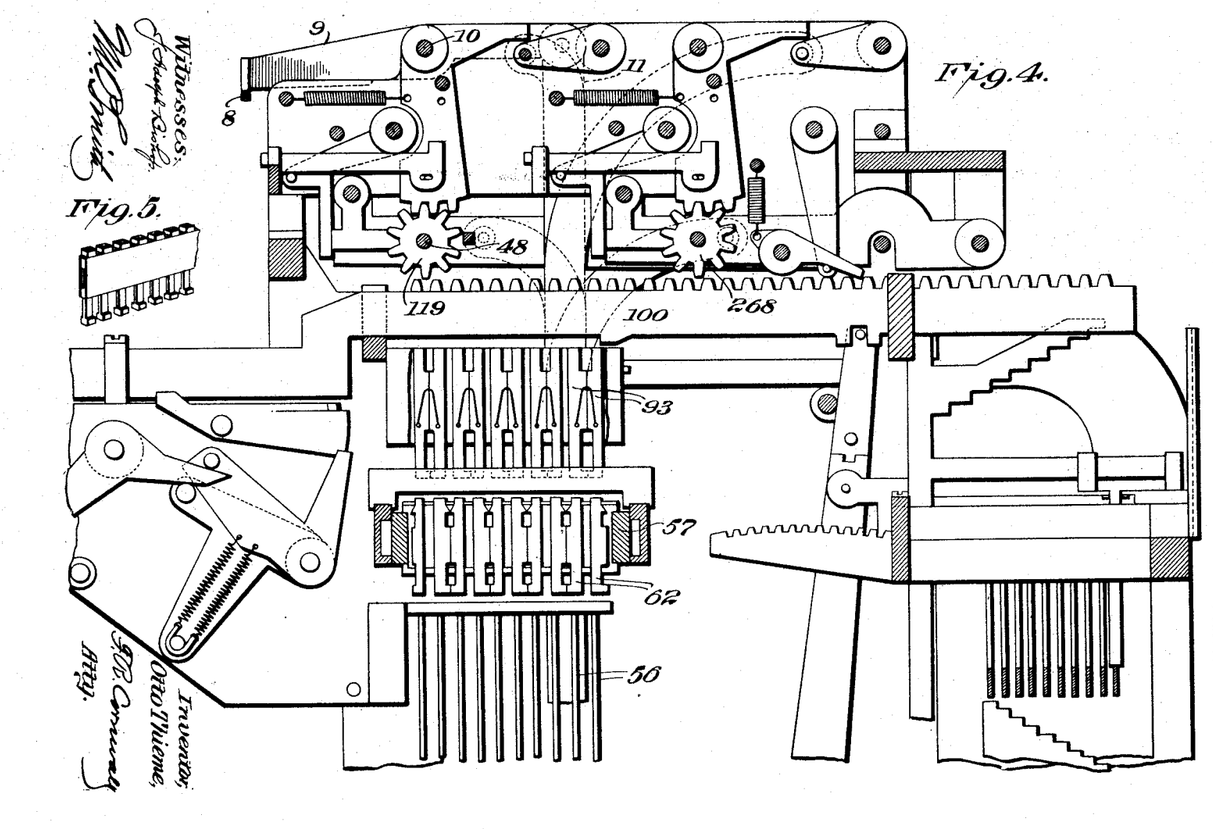
Fig. 4 is an enlarged vertical sectional view through the upper portion of the calculating machine.
Fig. 5 is a detail view of the front end of the rack bars showing the printing type.

Referring now to Figs. 1 and 3, it will be seen that the paper carriage 3 has a block 4 adjustable along the rack 5 on said carriage and that said block has a pin 6 projecting rearwardly therefrom for coöperating with a cam plate 8. This cam plate is mounted upon the forward end of a lever 9 fulcrumed at 10 and whose opposite end is connected to a bar 11 whose lower end has a bent foot portion 12 shown in Fig. 3. A spring 14 tends to hold the bar and its foot portion in the full line position shown in Fig. 3, in which position the heel of the bar marked "11ᵃ" lies over and is held at all times in close contact with the heel of the bell crank 181—182.

The purpose of spring 14 is not only to hold the lower end of bar 11 in contact with the heel portion about the crank lever 181, but to counterbalance to some extent the spring, not shown, which exerts its energies to normally hold the cams 82—109 in their normal position (to the right in Fig. 3), and which normal position of the cams 82—109 (they are shown in their middle or neutral position in Fig. 3) causes the heel of bell crank lever 181 to be elevated. Of course, the spring 14 is weaker than the spring which moves the cams 82—109 to their normal position.

Assuming now that it is desired to print a nonsignificant number and the paper carriage is adjusted to its home position so that the pin 6 will lie under the cam face $a$ of the cam plate 8, as shown in Fig. 3. In this position, the lever 9 will press the bar and rock the bell crank lever 181—182, so that cams 82—109 will be shifted to their neutral position, in which position they control neither the front nor the rear accumulators. Thus, any number set up in the adding mechanism when the carriage is in this position will be printed but not introduced into any accumulator.

As stated before, when the motor key is operated to effect the rocking of shaft 81, the carriage will be automatically spaced by the operation of the tabulating mechanism shown in my companion application and which is here illustrated in part but need not be described in detail. The tabulation or spacing of the carriage will cause the pin 6 to move under the face $b$ of the cam plate 8 and further rock the lever 9, whereby the cams 82—109 will be shifted to their third position. Thus when a number is set up in the adding mechanism and the motor key operated, such a number will not only be printed, but will be accumulated in the rear totalizer wheels 268. The automatic tabulation of the carriage whenever the operating shaft 81 is rocked will now carry the pin 6 beyond cam plate 8 and said cam plate being beyond the influence of pin 6 will permit cams 82—109 to return to their first or normal position, by means of springs connected thereto, but which are not shown in the accompanying drawings, so that they will be in control of the group of totalizer wheels 119 in operative relation to the racks. The significant number in the right hand column is now set up on the digit keys and the motor key again operated, whereupon said number will be introduced into a set of wheels 119 and at the same time the automatic tabulating mechanism will be brought into operation to again space the carriage for the purpose of moving the carriage into position to operate the back spacing mechanism whereby the carriage will be returned to its original or starting position in readiness to continue the cycle of operations just above described. As this back spacing mechanism forms no part of my present invention, I will not describe the same in detail here, as the same forms the subject matter of U. S. Patent No. 1,096,074, dated May 12, 1914.

Figure 7:
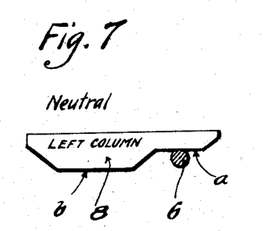
Figs. 7 to 9 are diagrammatic views of the carriage operated control cam, in different relations to the paper carriage, showing the manner of shifting the positions of the totalizer selecting cams.
Figure 8:
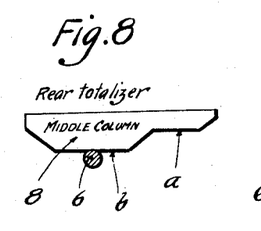
Figure 9:
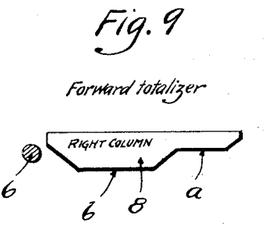

In Figs. 7 to 9 I have diagrammatically illustrated the relative position of a cam plate 8 which controls the position of the cams 82—109, Fig. 7 showing the parts when the paper carriage, which carries the pin 6, is at its extreme right-hand position, in which the pin 6 is located under the portion $a$ of cam 8, to position cams 82 and 109 in their second or neutral position for the printing of designation numerals, such as appear in the left-hand column, but which are not added together.

In Fig. 8 the carriage has been shifted leftwardly so as to locate the pin 6 under the face $b$ of the cam 8, thus raising the cam 8 and shifting the cams 82 and 109 so that they are placed in control of the rear totalizers to thereby accumulate the columns forming the middle column.

In Fig. 9 the carriage has been shifted leftwardly to an extent that the pin 6 is beyond the cam 8 and consequently the said cam is permitted to drop to its lowermost position in which the cams 82—109 are placed in control of the forward totalizers.

Figures 10, 11:
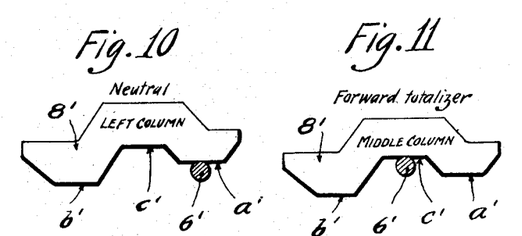
Figs. 10 to 12 are similar views of a modified form of carriage operated cam.
Figure 12:
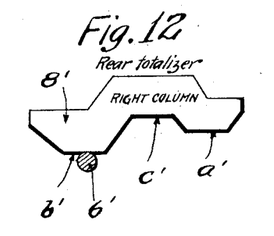

In Figs. 10 to 12, I have shown a modified form of cam plate 8' in which the pin 6' in Fig. 10 is located under the face $a'$ so that in the printing of the numbers in the left-hand column, the cams 82—109 will be in their central or neutral position and will not accumulate this column of figures.

When the carriage is shifted leftwardly so as to locate the pin 6' opposite the face $c'$, the cam 8' will drop to its lowermost position causing the cams 82—109 to accumulate the second or middle column of figures in the set of forward totalizer wheels 119. When the carriage is again shifted leftwardly, so as to be located under the face $b'$, the cam $a'$ will be raised to its highest position so as to cause the third or right-hand column of figures to be accumulated in the rear totalizer wheels 268.

Figure 6:
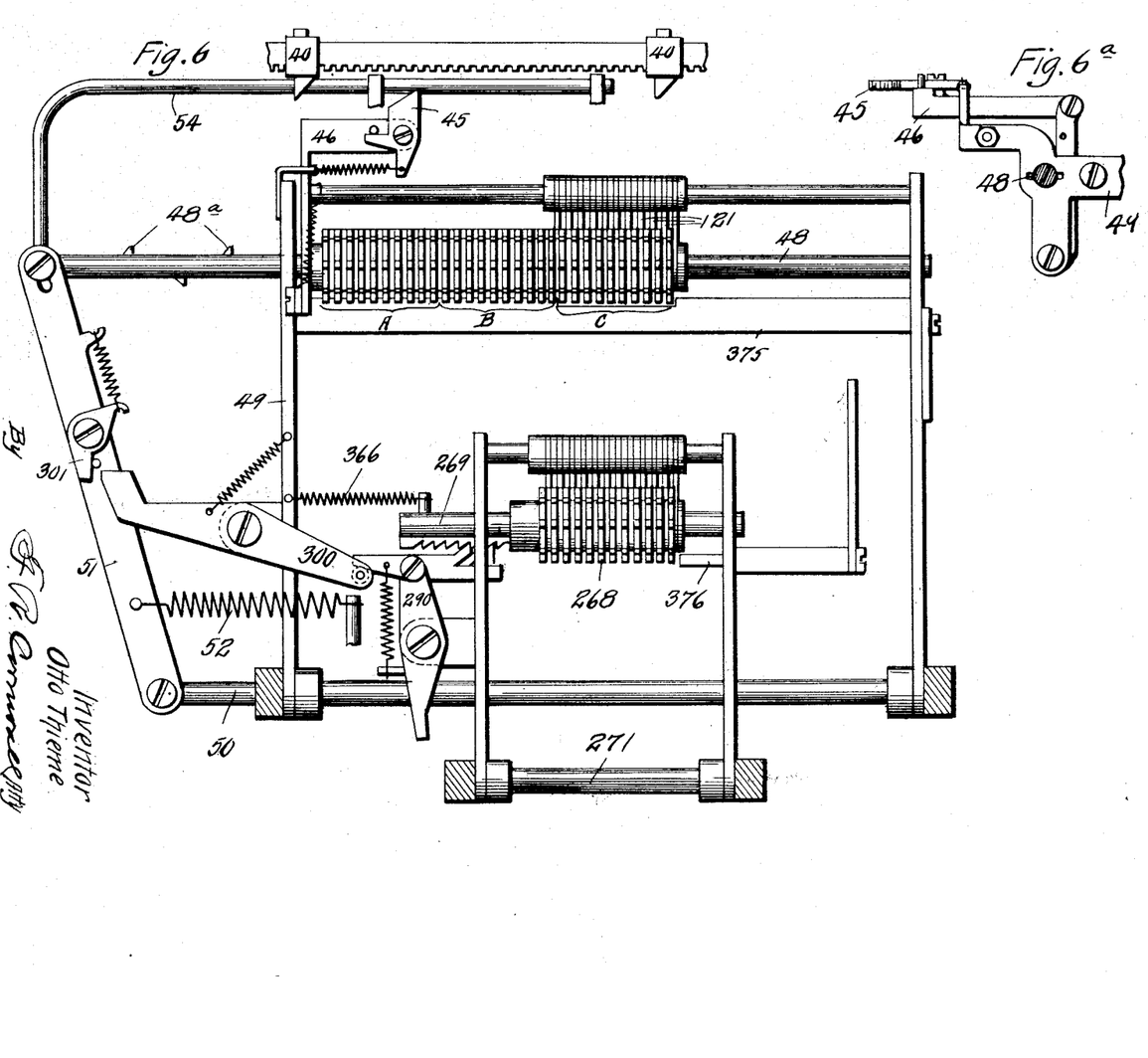
Fig. 6 is a plan view showing the front and rear totalizers and associate parts.
Figure 13:
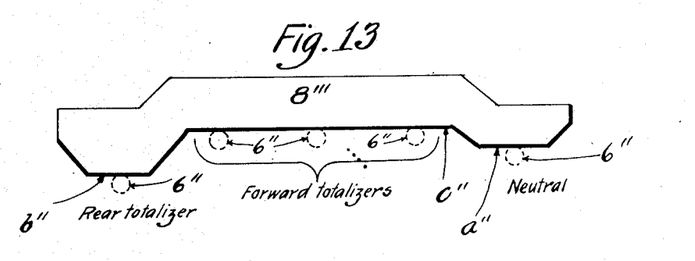
Figs. 13 and 14 are views of other modifications of said cam.

In Fig. 13, I have shown a construction in which the cam plate 8'' is elongated so that starting from its first position the pin 6'' coöperating with the face $a''$, will cause the left-hand column of figures or designating numerals to be printed without being added in any set of accumulator wheels. A further movement of the carriage leftwardly will locate the pin 6'' opposite the face $c''$ in which the cam 8'' will occupy its lowermost position in which the numbers in the middle column of figures will be accumulated in the left-hand set of forward totalizer wheels C (see Fig. 6). Then, as the carriage is shifted leftwardly so as to locate the pin 6'' about midway the face $c''$, one of the pins 42 carried by the adjustable block 40 on the carriage will engage the tappet 45 and will move the bar 46 rearwardly rocking the escapement lever 47 (see Fig. 6ª) so as to permit the forward totalizer wheels to be moved leftwardly with their shaft 48 so as to bring the middle group of totalizer wheels 119, indicated at B, into position to receive another column of figures. Upon the next shift of the carriage leftwardly another block 40 will cause its pin 42 to operate the escapement mechanism which controls the forward totalizers so as to position the group of wheels A over the racks, the pin 6'' in this instance still traveling on face $c''$, as shown at the left in Fig. 13. The next shift of the carriage will locate the pin 6'' opposite the face $b''$ so that the rear totalizers will now be brought into coöperative relation with the actuating racks. This enables me to accumulate more than two columns of figures. To illustrate the control of the totalizers by the cam plate 8'', shown in Fig. 13, the following example is given.

| Car No. | Gross. | Tare. | Net. | Rate. |
|---|---|---|---|---|
| 1234 | 1456 | 789 | 667 | .20 |
| 6060 | 2125 | 1350 | 775 | .25 |
| 7887 | 1980 | 1630 | 750 | .25 |
| | 5561 | 3769 | 2192 | .70 |

Figure 14:
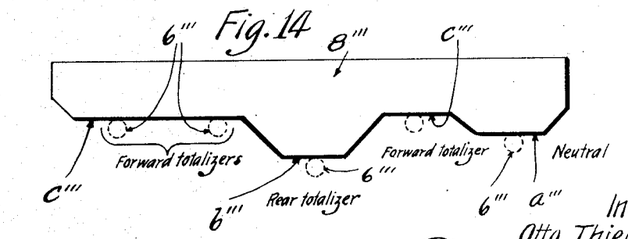

In Fig. 14, I have shown the cam plate 8''' whose faces $a'''$, $c'''$, and $b'''$ coöperate with the pin 6''' in the manner just above described, except that in this instance the face $b'''$ is located at a point in the length of the face $c'''$. In all of these changes or modifications the adjustable blocks 40, whose pins control the position of the forward groups of totalizer wheels, are positioned according to requirements. I have not described in detail all of the parts which are fully disclosed in the French patent to which reference has heretofore been made, as I deem the same to be unnecessary here.

To avoid interference by the bar 11 in taking a total from the rear totalizer wheel 268, I form a notch or recess in the underside of said bar as shown in Fig. 3, in which notch or recess fits a pin on the upwardly extending member of a bell crank lever 15. The horizontally extending member of this bell crank is provided with a pin which extends over the bell crank 310 which is operated whenever the P or product key is depressed. When this P or product key of the Belgian and French patents referred to is depressed, the number standing in the wheels 268 will be printed and said wheels will remain clear at the end of the operation unless P or product key is held down throughout the entire stroke of the machine, in which event the product or total will be printed as a sub-total and reregistered in the wheels 268. When the P or product key is depressed in this instance, it will rock the bell crank 15 and move the heel of the bar 11 beyond control of the bell crank 181—182, thus permitting the cams 82—109 to be shifted to their proper position through the medium of said bell crank 181—182 when the P or product key is depressed.

What I claim is:

1. In a calculating machine, the combination of a plurality of totalizers, a movable paper supporting carriage, positioning means under control of said carriage for rendering a selected group of totalizer wheels operative, and total taking mechanism including means for rendering said positioning means ineffective.

2. In a calculating machine, the combination of a plurality of totalizers, a movable paper supporting carriage, positioning means under control of said carriage for rendering a selected group or groups of totalizer wheels operative, and total taking mechanism including means for rendering said positioning means ineffective.

3. In a calculating machine, the combination of a plurality of groups of totalizer wheels, actuating racks therefor, printing type positioned by said racks, a laterally movable paper supporting carriage, and means controlled by said carriage for governing the coöperation of the totalizers and their racks without affecting the type positioning operation of the latter.

4. In a calculating machine, the combination of a plurality of groups of totalizer wheels, actuating racks therefor, printing type positioned by said racks, said totalizer wheels being adapted to govern the total printing positions of said type, a laterally movable paper supporting carriage, and means controlled by the carriage for governing the coöperation of the totalizers and their racks without affecting the type positioning operation of the latter whereby significant numbers only will be accumulated in a selected group of totalizer wheels.

5. In a calculating machine, the combination of a plurality of groups of totalizer wheels, actuating racks therefor, printing type positioned by said racks for printing significant and non-significant numbers, the total printing positions of said type being controlled by said totalizer wheels, a laterally movable paper carriage, and means controlled by said paper carriage for governing the coöperation of said racks and totalizers in item printing operations so that only significant numbers of those printed will be accumulated in a selected group or groups of totalizer wheels.

6. In a calculating machine, the combination of a group of totalizer wheels, a laterally movable paper supporting carriage, means under control of said carriage for causing only one of a series of numbers set up on the keyboard to be introduced into said totalizer, a total key and its connections for obtaining a total from said totalizer, and means controlled by said total taking mechanism for disabling the totalizer carriage controlling mechanism during total taking operations.

7. In a calculating machine, the combination of a plurality of groups of totalizer wheels, actuating devices therefor, printing type positioned by said actuating devices for printing numbers represented by the positions of said racks, a laterally movable paper carriage, means controlled by said carriage for determining whether a nonsignificant number shall be printed but not accumulated or a significant number shall be printed and accumulated in a predetermined group of totalizer wheels, an operating rock shaft in control of said actuating devices, and tabulating mechanism operated by said rock shaft to automatically position the paper carriage whereby the significant and nonsignificant numbers may be printed in column order respectively and said carriage may control the introduction or nonintroduction of a number into a selected group of totalizer wheels.

8. In a calculating machine, the combination of a plurality of groups of totalizer wheels, actuating devices therefor, type positioned by said actuating devices for printing significant and nonsignificant numbers, a laterally movable paper carriage, means controlled by said paper carriage for determining whether a nonsignificant number shall be printed but not accumulated or a significant number shall be printed and accumulated in a selected group of totalizer wheels, an operating rock shaft for controlling the movement of said actuating devices, a tabulating mechanism which is rendered effective to space the paper carriage at every operation of said operating rock shaft, whereby said carriage is positioned to determine whether or not a number printed shall be nonsignificant and not accumulated or significant and accumulated in a selected group of totalizer wheels, and means on said carriage for controlling a back spacing mechanism whereby, when the last number in a lineal series is printed, said back spacing mechanism will return the carriage to its home or starting position.

9. In a calculating machine, the combination of a plurality of shiftable groups of totalizer wheels, actuating devices therefor, a movable paper carriage for effecting the shift of said groups of totalizers so as to bring a selected group into operative position with the actuating devices, and other means also controlled by said carriage for rendering said operatively positioned group of totalizer wheels ineffective.

10. In a calculating machine, the combination of a plurality of shiftable groups of totalizer wheels, actuating devices therefor, a movable paper carriage for effecting the shift of said groups of totalizers so as to bring a selected group into operative position with the actuating devices, and other means also controlled by said carriage for rendering said operatively positioned group of totalizer wheels effective or ineffective.

11. In a calculating machine, the combination of a plurality of groups of totalizer wheels and their actuating devices, recording mechanism controlled by said actuating devices, a movable paper carriage, means on said paper carriage for shifting certain groups of said totalizer wheels into and out of operative position relative to said actuating devices, and other means controlled by said paper carriage for rendering the operatively positioned groups of totalizer wheels effective or ineffective whereby columns of designating characters may be recorded, but not accumulated, and other columns of significant numbers may be recorded and accumulated.

In testimony whereof I hereunto affix my signature in the presence of two witnesses, this 2nd day of April, 1913.

OTTO THIEME.

Witnesses:
 M. P. SMITH,
 M. A. HANDEL.

Copies of this patent may be obtained for five cents each, by addressing the "Commissioner of Patents, Washington, D. C."